United States Patent
Brorsen et al.

(10) Patent No.: US 11,111,901 B2
(45) Date of Patent: Sep. 7, 2021

(54) SYSTEM AND A METHOD FOR OPTIMAL YAW CONTROL

(71) Applicant: Mita-Teknik A/S, Rødkærsbro (DK)

(72) Inventors: Martin Brorsen, Brande (DK); Lars Risager, Ry (DK); Morten Bro, Nørresundby (DK)

(73) Assignee: Mita-Teknik A/S, Rodkaersbro (DK)

( * ) Notice: Subject to any disclaimer, the term of this patent is extended or adjusted under 35 U.S.C. 154(b) by 0 days.

(21) Appl. No.: 16/090,839

(22) PCT Filed: Apr. 3, 2017

(86) PCT No.: PCT/DK2017/050102
§ 371 (c)(1),
(2) Date: Oct. 3, 2018

(87) PCT Pub. No.: WO2017/174088
PCT Pub. Date: Oct. 12, 2017

(65) Prior Publication Data
US 2019/0107100 A1  Apr. 11, 2019

(30) Foreign Application Priority Data
Apr. 4, 2016  (DK) .......................... PA 2016 70197

(51) Int. Cl.
*F03D 7/02* (2006.01)

(52) U.S. Cl.
CPC ...... *F03D 7/0204* (2013.01); *F05B 2270/329* (2013.01); *F05B 2270/802* (2013.01); *Y02E 10/72* (2013.01)

(58) Field of Classification Search
CPC .............. F03D 7/0204; F05B 2270/329; F05B 2270/802; Y02E 10/723
(Continued)

(56) References Cited

U.S. PATENT DOCUMENTS

2008/0111379 A1  5/2008  Altemark
2010/0066087 A1  3/2010  Hayashi
(Continued)

FOREIGN PATENT DOCUMENTS

CN  203939626 U  11/2014

*Primary Examiner* — Rocio Del Mar Perez-Velez
*Assistant Examiner* — Christopher W Carter
(74) *Attorney, Agent, or Firm* — James Creighton Wray

(57) ABSTRACT

The present invention relates to a system and a method for optimal yaw control of a wind turbine, comprising a tower carrying a rotatable nacelle rotated by a yaw motor, which nacelle comprises at least one generator connected by a shaft to a rotor, comprising one or more wings, which nacelle further comprises means for detecting wind direction and wind velocity, which system performs measurement and storing data related to power production, wind velocity and wind direction. The object of this invention is to optimize the yaw position of a nacelle to the wind direction. The object can be fulfilled by power production measured in a positive direction to actual yaw position is accumulated in a first storages related to measured wind direction and that power production measured in a negative direction to actual yaw position is accumulated in a second storages related to measured wind direction. By this system the power production of the wind turbine is optimized by self-calibrating yaw control.

4 Claims, 2 Drawing Sheets

(58) Field of Classification Search
USPC .......................................................... 700/287
See application file for complete search history.

(56) References Cited

U.S. PATENT DOCUMENTS

| | | |
|---|---|---|
| 2011/0101691 A1 | 5/2011 | Hashimoto |
| 2011/0309621 A1* | 12/2011 | Nielsen ................ F03D 7/0276 290/44 |
| 2014/0186176 A1 | 7/2014 | Andersen |
| 2015/0086357 A1 | 3/2015 | Gregg |

* cited by examiner

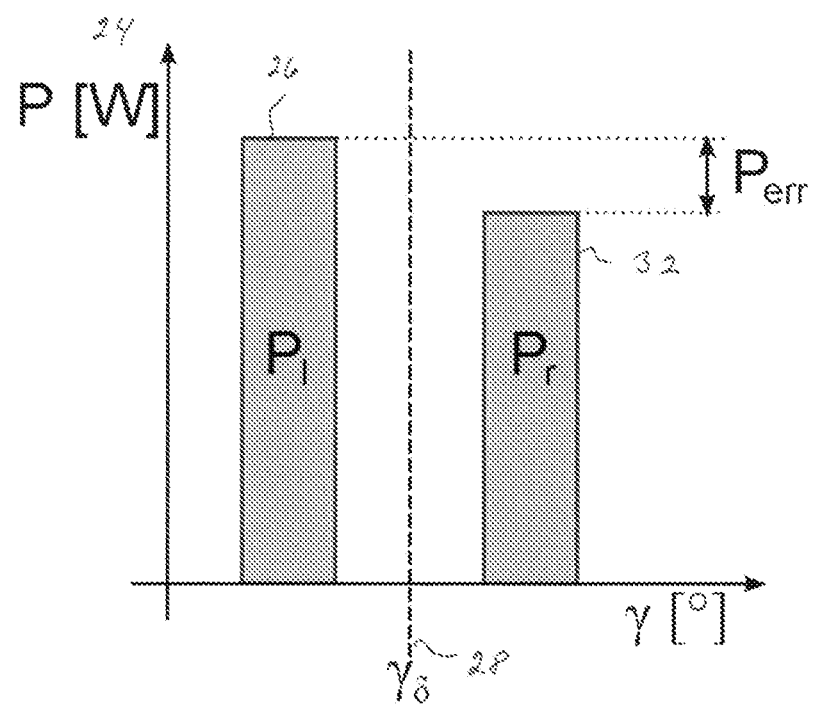

SYSTEM AND A METHOD FOR OPTIMAL YAW CONTROL

This application claims the benefit of Danish Application No. PA 2016 70197 filed Apr. 4, 2016 and PCT/DK2017/050102 filed Apr. 3, 2017, International Publication No. WO 2017/174088 A1 which are hereby incorporated by reference in their entirety as if fully set forth herein.

FIELD OF THE INVENTION

The present invention relates to a system and a method for optimal yaw control of a wind turbine, comprising a tower carrying a rotatable nacelle rotated by a yaw motor, which nacelle comprises at least one generator connected by a shaft to a rotor, comprising one or more wings, which nacelle further comprises means for detecting wind direction and wind velocity, which system performs measurement and storing data related to power production, wind velocity and wind direction.

BACKGROUND OF THE INVENTION

US2014186176A discloses a method of determining a degree of yaw error of a wind. The method includes obtaining wind pressure measurement values from in front of the rotor plane, which wind pressure measurement values exhibit a periodic nature related to a rotation of a spinner of the wind turbine, performing a signal processing step to process the wind pressure measurement values to determine a phase offset of the wind pressure measurement values relative to an angular reference, and deriving a yaw error angle from the phase offset. A method of establishing a relationship between a phase offset of wind pressure measurement values and a degree of yaw error of a wind turbine, a yaw error determination unit, and a wind turbine are also provided.

US 2008/01111379 A1 discloses a wind energy installation including a pylon, a pilotable machine housing arranged on the pylon, a rotor configured to rotate on an end face of the machine housing and to drive a generator for production of electrical power, measurement devices for measurement of wind speed and direction and of an electromechanical quantity, a controller for the pivoting device, and a calibration module for the controller that comprises an efficiency measure element configured to calculate an efficiency measure for the production of the electromechanical quantity via the wind speed and an evaluation device. The evaluation device includes a classifier with outputs for positive and negative wind directions and calculation elements for determining mean values of the outputs and a comparator element which determines the difference between the mean values and outputs a calibration signal corresponding to the difference to the controller for the pivoting device.

OBJECT OF THE INVENTION

The object of this invention is to optimize power productions of wind turbines. A further object is to let a wind turbine optimize the yaw position of a nacelle to the wind direction. A further object of the invention is to optimize the power production mostly by use of existing hardware in a wind turbine.

DESCRIPTION OF THE INVENTION

The object can be fulfilled by a system, as disclosed in the preamble of claim 1 and further modified in that power production measured in a positive direction to actual yaw position is accumulated in a first storages related to measured wind direction and that power production measured in a negative direction to actual yaw position is accumulated in a second storages related to measured wind direction, which system performs the accumulation of positive and negative directions, which system performs a yaw correction based on comparing of positive and negative directions of power production.

By this system, it can be achieved that existing components operating in a wind turbine can be used by this system in order to optimize the power production of the wind turbine by letting the wind turbine perform self-calibrating yaw control. By this system the wind turbine will during normal operation monitor the power production in relation to measured wind speed and wind direction. By this system stochastic wind direction change in relation to the yaw position of the wind turbine, wind from different positive or negative directions related to the yaw position can be measured and related data referring to positive or negative wind directions related to the actual yaw position are accumulated in two different storages. By comparing the data related to power production plus or minus to the yaw direction can be compared and the difference in actual measured production is used for new calibration of the yaw control. In this way all necessary components for performing the self-calibrating yaw control already exist in the wind turbine. All new features that are necessary in order to use this system are a question about a new software package placed in existing controllers.

By optimizing the yaw position of a wind turbine it is, possible to increase the power production of the wind turbine between two to five percent. The increase in production is of course dependent on the wind speed, so with extremely low wind speed optimizing gives only very little results. Also in very high wind situations other regulation systems such as pitch control is reducing the power production, therefore, the system as disclosed here is operational in wind speed between maybe 5-15 metres per second. Statistically, this wind velocity seems to be existing most of the time. Therefore, this system can be very important in optimizing production of wind turbines.

In a preferred embodiment for the invention data related to power production in positive and negative wind directions can be accumulated during at least a defined time period. In order to have the relatively best conditions for yaw calibration it is necessary to perform measurement of positive and negative power production over a defined time period. You can probably have a result after a few hours of operation but the result will be much better for a longer period of time. In fact, a system could operate where the self-calibrating yaw control continues in operation. Probably in a system where the oldest data in the accumulation registers is deleted. In that way the system will continuously be operating but only having influence on data from the defined time period.

In a further preferred embodiment for the invention the defined time period can be longer than 24 hours. It is possible in one embodiment to achieve a good result which has been achieved in an assimilated system. In practical use of the system the results will probably show that period as long as one week will be much more effective for having the correct yaw correction.[HEP1]. In a further preferred embodiment for the invention the system can be adapted to use at least a yaw corr. algorithm, which system is further adapted to transmit a signal Perr to a PI controller which performs integration of the signal Perr, which system is further adapted to communicate a yaw offset set point $\gamma\delta$ to a yaw controller which system is further adapted to communicate yaw correction signals to a wind turbine.

Hereby only a few extra electronic or software modules are necessary in order to let this system operate in an existing wind turbine.

In a further preferred embodiment for the invention can the wind turbine be adapted to communicate a yaw signal γ representing the actual yaw position of the wind turbine back to the yaw controller, which yaw signal γ is communicated further back to the yaw corr. algorithm. Hereby the feed forward regulation that is performed for the yaw control also uses a feedback system were actual yaw position is used for a new input for the yaw correction algorithm. Because of the signal forward direction there is a PI regulator there is a time delay in the forward regulations which is probably necessary for avoiding oscillations in the yaw system.

In a further preferred embodiment for the invention the yaw corr. algorithm can be adapted to receive input P from the actual power production of the wind turbine. Hereby it can be achieved that not only actual measured wind direction and wind velocity is used for the yaw control, but also data representing actual power production is used as an input to the yaw correction algorithm. Hereby, any deviation in power production related to plus/minus wind direction will be part of the accumulated plus/minus values in the system.

In a further preferred embodiment for the invention the system can be adapted to perform sufficient filtering and estimate average power to the left and right of the yaw offset γδ. Hereby a further filtration can be performed which can reduce the content of relatively high frequency yaw control commands. Also potential noise that is generated from other electrical systems that could be picked up in signal lines will be reduced in that filtration.

The pending patent application further discloses a method for self-calibrating yaw control as previous disclosed and in the following steps of operation:

a. let the wind direction change stochastically and measure power production of a wind turbine for positive and negative yaw errors, b. perform accumulation of data representing estimated power production for positive and negative yaw errors, c. perform the accumulation of data in at least a defined time period, d. use the accumulated data to estimate a power difference Perr (42) between measured positive and negative yaw generated power, e. generate a yaw offset set point γδ (46)

f. use the yaw offset set point γδ (46) for the yaw controller (48).

Hereby, it can be achieved that this method leads to a highly effective way for yaw correction of wind turbines. This can be achieved mostly by existing equipment in the wind turbine. Only a few new software modules are necessary in order to increase the power production. The reason for this power correction is that for many wind turbines actual wind directions are measured by measuring systems that in some situations have measuring failures. Also the position of the typical direction measurement for wind placed at the top of the nacelle will have some influence on the wind passing along the nacelle. But also turbulence generated by the rotating wings can in some situations have influence on the actual measurement of wind direction. Also for wind turbines operated at land, disturbance of the wind can lead to a measurement failure. An effect of measuring failures which has probably never developed is simply the change of wind direction in relation to the height over the earth surface. With wind turbines operating with extremely long wings, there can be sufficient change in wind direction from the wind height measuring the wind direction at the nacelle and the wind that is hitting the wings of the wind mill when they are at the top position. Therefore, there are a lot of good arguments for using the self-calibrating yaw control.

By an alternative embodiment for this invention can the Power production used as input for the algorithm be full or partly be supplemented by Cp as input. Cp is defined as the effect of the rotor, calculated from the generated power P, the wind speed V, air density Rho, the rotor area A, calculated by the following formula: $Cp=P/(½×A×Rho×V^3)$.

In some situations where the algorithm is calculating a correction signal based on P or Cp input signals, the algorithm is only calculating correction under some defined conditions.

a.—Calculate correction for defined intervals of direction of the nacelle or direction of the wind relative to the nacelle. Hereby, it is possible to stop using the algorithm from directions where e.g. landscape characteristics such as hills at one side of the wind turbine or if there is shadow effect from one defined direction, then the calculation of correction values could be cancelled for some defined conditions.

b.—only perform correction calculation for defined intervals of the turbulence intensity of the wind. Hereby, the shadow effects from other wind turbines or turbulence from the atmosphere or turbulence from the wind introduced by the terrain or shadows from buildings etc. which all can reduce the effectiveness of the algorithm.

c.—only calculate correction for one or more wind speed intervals. That could be 5-9 m/s, hereby the algorithm can be used in the wind speed where it is most effective and not used where the algorithm is less efficient or not working.

d.—further it is possible to perform a combination of the conditions a, b and c.

Hereby, it is possible to adjust the algorithm to the actual use in a wind turbine. The algorithm for yaw correction can of course increase the power production for a wind turbine, but in some conditions this algorithm will probably not operate optimal. Therefore, it is highly effective if the algorithm is in use where the conditions are optimal and where the yaw correction can be formed and the power production can be increased.

DESCRIPTION OF THE DRAWING

FIG. 3 discloses the method to use this information in order to estimate a power difference.

DETAILED DESCRIPTION OF THE INVENTION

Figure 1:
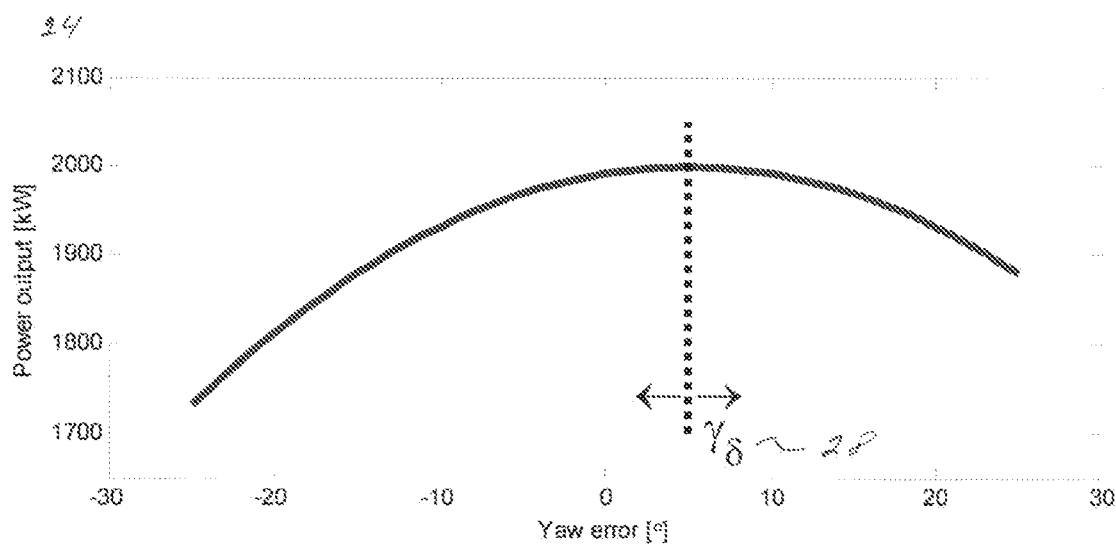
FIG. 1 discloses theoretical power generation as function of yaw misalignment.

Since the wind is a varying energy resource, it is necessary to track the wind direction with a turbine rotor in order to optimize the power intake. This is done by letting a yaw motor rotate the turbine nacelle according to a yaw sensor (wind vane) by a yawing algorithm. The wind vane and the airflow around the rotor and the nacelle is often offset from the true wind direction, leading to a general drop in power, as illustrated in FIG. 1. The potential in AEP of correcting the yaw offset is up to several percentages, thus being a strong argument for inventing an automatic correction algorithm. The invention described in this document includes a yaw controller which tracks a specific power-optimal yaw set point.

FIG. 1: The blue line is theoretical power 24 as function of yaw misalignment. The yaw measurement is offset by 5°, leading to a power optimal yaw marked by γδ 46. As indicated by arrows, the actual wind direction will have some fluctuations from the point where the yaw adjustment is fixed for a period. Wind direction will change plus and minus to the defined direction. For this patent application we have realized that yaw misalignment often happens simply because the measurement of the wind direction is performed in a rather primitive way, for example by a wind vane placed on the top of a nacelle. Turbulence or shadow effects can change the wind direction and the rotating rotor can have some influence on the actual wind direction. Also the actual shape of the nacelle can have some influence on the actual wind direction. By continuous measurement of actual produced power of a wind turbine, which often takes place, it is possible to perform a correlation to the measured wind direction. In the pending application, this performed an accumulation of power production plus/minus in relation to the yaw position. It is probably necessary to measure the power production for a rather long time in order to have a reliably better adjustment of the yaw position.

Figure 2:
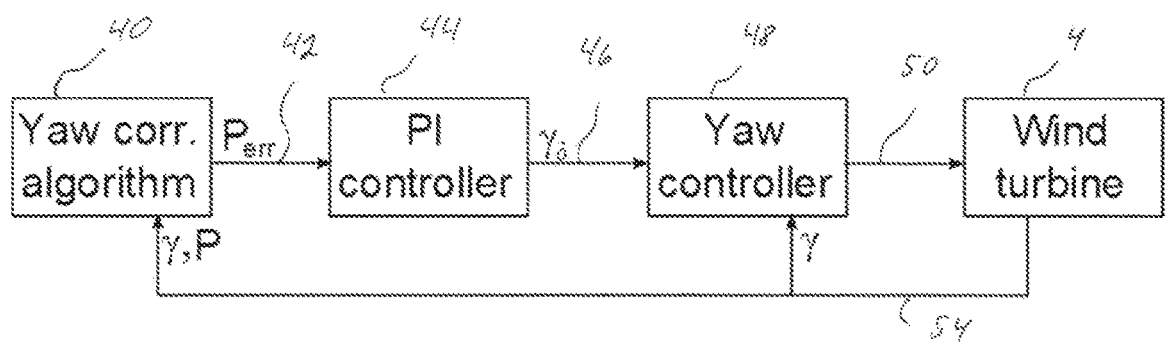
FIG. 2 discloses a block diagram overview of the Yaw Alignment Correction algorithm.

FIG. 2: Block diagram overview of the Yaw Alignment Correction algorithm 40. An algorithm calculates a power error $P_{err}$ 42 used by a PI controller 44. This, in turn, gives a yaw offset setpoint γγ 46 which is tracked by a yaw controller 48. γ: yaw error measurement 50, P: power measurement 24. FIG. 2, which describe how the parts interface to the turbine 4. During normal operation the wind direction 20 changes stochastically, leading to a variation in yaw error γ 46 and power P 24. Hereby, a more or less continuous yaw correction algorithm is operating. This yaw correction algorithm is probably also a module where the accumulation of power production takes place. At least there is a power input to that module. After a defined delay, communication of the Perr 42 to the PI controller 44 will probably start. This PI controller will perform integration of the signal that is received, so that any quick response in the pen signal 42 will be very much delayed. The output from the PI controller is the yaw correction signal 46, which is transmitted into the yaw controller 48. This yaw controller 48 generates a commanding signal 50 to the wind turbine and forces the wind turbine to change its yaw direction. The actual yaw signal 54 is transmitted back to the yaw controller 48 and back to the yaw correction algorithm 40. That way, a continuous adjustment of the yaw signal can be performed, even when the yaw controller 40 has performed with a relatively long time delay, which could be more than 24 hours. In order to get reliable data it is possible to change the yaw direction of the nacelle into a more correct position and hereby maybe increase the yield of power up to 5 percent.

FIG. 3 describes the method to use this information in order to estimate a power difference, $P_{err}$, which indicates an imbalance between positive- and negative yaw error. Feeding $P_{err}$ to a PI controller it is then possible to track zero imbalances by minimizing $P_{err}$. The output of the PI controller is the yaw offset setpoint γδ, which is used as the set point for the yaw controller. Thereby the yaw controller becomes self-calibrating in order to maximize the power output: The average power to the left 26 and right 32 of the yaw offset γδ 46 is estimated with sufficient filtering. The difference, $P_{err}$ 42 indicates whether it is possible to increase the power output by moving the yaw offset set point 46. At FIG. 3 it is clearly indicated that there is a difference in power production between 26 and 32. Therefore this figure indicates that a yaw correction in the correct direction of the PI 26 probably could give a better yield.

It is possible by this patent application to increase the power production of a wind turbine in any place where a wind turbine is operating. The optimization of the production seems to be effective for medium wind maybe starting from 5 metres per second and ending at approximately 15 metres per second. At very low wind velocities it is probably possible to increase the yield but it is very difficult to measure the positive effect. Above 15 metres per second, wind mills are starting maximal production and other regulation means, such as pitch control or maybe stall control will reduce the production, so the method of self-adjustment of the yaw has only minimal effect. But measured over a year, it is a fact that between 5 and 15 metres per second is where most of the power production is performed by nearly all wind turbines. Therefore, the effect of the pending application, which has shown that it is possible to increase the power production maybe up to 5 percent, could be very important, not only at single operating wind mills but probably also at wind farms at land or wind farms at sea. In wind farms every single wind turbine will optimize its yaw position according to the actual wind situation. In that way different shadowing effects are maybe compensated in a highly effective way.

LIST OF NUMBERS

System 2
wind turbine 4
tower 6
nacelle 8
generator 10
shaft 12
rotor 14
wings 16
means for detecting wind direction 18,20
wind velocity 22
power production 24
power production measured in a positive direction 26
yaw position 28
first storages 30
power production measured in a negative direction 32
second storages 34
defined time period 36
yaw correction, algorithm 40
signal Perr 42
PI controller 44
yaw offset set point γδ 46
yaw controller 48
yaw correction signals 50
a yaw signal γ 54

The invention claimed is:

1. A system adapted for optimal yaw control of a wind turbine, comprising:
   a tower carrying a rotatable nacelle rotated by a yaw motor,
   wherein the nacelle comprises at least one generator connected by a shaft to a rotor, comprising one or more wings, said nacelle further comprises a sensor for detecting wind direction and wind velocity,
   the system performs measurement and stores data related to power production of the wind turbine, wind velocity and wind direction, wherein power production of the wind turbine measured in a positive direction to actual yaw position, generating a positive yaw error, is accumulated in a first storage and power production of the wind turbine measured in a negative direction to actual yaw position, generating a negative yaw error, is accumulated in a second storage, whereby data related to power production in positive and negative yaw errors is accumulated during a defined time period that is longer than 24 hours, wherein the system calculates an effect of the rotor (Cp) which is defined as:

$$Cp=P/(\tfrac{1}{2}*A*Rho*V^3);$$

where P is generated power, V is wind speed, Rho is air density, and A is rotor area;

wherein the system is adapted to provide the positive and negative yaw error and effect of the rotor (Cp) to a yaw correction algorithm, wherein the yaw correction algorithm utilizes the effect of the rotor (Cp) and comparison of power production accumulated for positive and negative yaw errors to generate a power difference signal (Perr), wherein the system is further adapted to transmit the power difference signal (Perr) to a PI controller which performs integration of the signal (Perr) and generates and communicates a yaw offset set point to a yaw controller, and wherein the yaw controller communicates the yaw offset setpoint to the wind turbine and controls the wind turbine yaw using the yaw offset setpoint.

2. The system according to claim 1, wherein the wind turbine is adapted to communicate a yaw signal ($\gamma$) representing the actual yaw position of the wind turbine back to the yaw controller, which yaw signal ($\gamma$) is communicated further back to the yaw correction algorithm.

3. The system according to claim 2, wherein the yaw correction algorithm is adapted to receive input (P) from the actual power production of the wind turbine.

4. A method for self-calibrating yaw control of the wind turbine system of claim 1 comprising the following steps of operation:
   a) measuring power production of a wind turbine for positive and negative yaw errors,
   b) performing accumulation of data representing measured power production for positive and negative yaw errors,
   c) performing the accumulation of data in at least a defined time period which is longer than 24 hours,
   d) calculating an effect of the rotor (Cp) using generated power, wind speed, air density, and rotor area of the turbine,
   e) using the accumulated data of power production in the positive and negative yaw error direction and effect of the rotor (Cp) to estimate a power difference (Perr),
   f) generating a yaw offset set point based on the power difference (Perr),
   g) controlling the wind turbine yaw using the yaw offset setpoint.

* * * * *